United States Patent
Kodaka et al.

(10) Patent No.: US 8,494,733 B2
(45) Date of Patent: Jul. 23, 2013

(54) PRIME MOVER ROTATION SPEED CONTROL SYSTEM FOR HYDRAULICALLY DRIVEN VEHICLE

(75) Inventors: Katsuaki Kodaka, Abiko (JP); Hidetoshi Satake, Ishioka (JP); Youichi Kowatari, Kasumigaura (JP); Yuuki Gotou, Tsuchiura (JP); Kazuhiro Ichimura, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 736 days.

(21) Appl. No.: 12/529,162

(22) PCT Filed: Feb. 28, 2008

(86) PCT No.: PCT/JP2008/053530
§ 371 (c)(1),
(2), (4) Date: Aug. 28, 2009

(87) PCT Pub. No.: WO2008/105500
PCT Pub. Date: Sep. 4, 2008

(65) Prior Publication Data
US 2010/0106382 A1    Apr. 29, 2010

(30) Foreign Application Priority Data
Feb. 28, 2007    (JP) .................................. 2007-049723

(51) Int. Cl.
*G06F 19/00* (2011.01)
(52) U.S. Cl.
USPC .................... 701/54; 701/93; 701/96; 701/84; 60/431; 180/53.4; 180/305; 180/306; 180/307; 180/315; 37/348
(58) Field of Classification Search
USPC ............. 701/54, 93, 96, 84; 60/431; 180/900, 180/53.2, 53.4, 305, 306, 307, 315, 321; 37/348
See application file for complete search history.

(56) References Cited

U.S. PATENT DOCUMENTS

| | | | |
|---|---|---|---|
| 5,025,685 A | 6/1991 | Kobayashi et al. | |
| 5,233,889 A * | 8/1993 | Iizuka | 477/154 |

(Continued)

FOREIGN PATENT DOCUMENTS

| | | |
|---|---|---|
| EP | 1 550 803 A1 | 7/2005 |
| JP | 2-63933 A | 3/1990 |

(Continued)

OTHER PUBLICATIONS

International Search Report dated Mar. 25, 2008 (Two (2) pages).

(Continued)

*Primary Examiner* — Thomas Black
*Assistant Examiner* — Sara Lewandroski
(74) *Attorney, Agent, or Firm* — Crowell & Moring LLP

(57) ABSTRACT

A prime mover rotation speed control system for hydraulically driven vehicle includes: a hydraulic pump driven by a prime mover; a hydraulic motor for traveling driven with pressure oil supplied from the hydraulic pump; an operation member that outputs a travel command in accordance with an amount of operation by the operation member; a flow control device that controls one of a flow of the pressure oil from the hydraulic pump to the hydraulic motor and a flow rate of the pressure oil discharged from the hydraulic motor, based on the travel command that is output in accordance with the amount of operation by the operation member; a target rotation number outputting device that outputs a target rotation number of the prime mover based on a command; a rotation number control device that controls a rotation number of the prime mover to be the target rotation number; a vehicle speed detection device that detects a vehicle speed; and a vehicle speed calculation device that calculates a target vehicle speed in accordance with the amount of operation by the operation member. The rotation number control device includes a correction device that adjusts the target rotation number based on the vehicle speed detected by the vehicle speed detection device and the target vehicle speed calculated by the vehicle speed calculation device.

5 Claims, 9 Drawing Sheets

U.S. PATENT DOCUMENTS

| | | | |
|---|---|---|---|
| 5,282,400 A * | 2/1994 | Kobayashi et al. | 477/37 |
| 5,477,679 A * | 12/1995 | Tatsumi et al. | 60/431 |
| 6,122,588 A * | 9/2000 | Shehan et al. | 701/93 |
| 6,205,387 B1 * | 3/2001 | Ochiai | 701/51 |
| 6,345,222 B1 * | 2/2002 | Toukura et al. | 701/53 |
| 6,389,347 B1 * | 5/2002 | Nozaki | 701/54 |
| 6,440,037 B2 * | 8/2002 | Takagi et al. | 477/37 |
| 6,565,482 B2 * | 5/2003 | Kobayashi et al. | 477/174 |
| 6,938,719 B2 * | 9/2005 | Ishimaru et al. | 180/305 |
| 8,088,036 B2 * | 1/2012 | Fuchs et al. | 477/37 |
| 2003/0105574 A1 * | 6/2003 | Ino et al. | 701/93 |
| 2003/0158647 A1 * | 8/2003 | Katakura et al. | 701/70 |
| 2004/0044458 A1 * | 3/2004 | Kadota | 701/55 |
| 2004/0093145 A1 * | 5/2004 | Tanimichi et al. | 701/93 |
| 2004/0097328 A1 * | 5/2004 | Makiyama et al. | 477/43 |
| 2006/0056978 A1 * | 3/2006 | Tatsuno et al. | 417/42 |
| 2006/0144974 A1 * | 7/2006 | Umeda et al. | 241/30 |
| 2009/0238696 A1 * | 9/2009 | Satake et al. | 417/34 |
| 2010/0032219 A1 * | 2/2010 | Udagawa et al. | 180/65.265 |

FOREIGN PATENT DOCUMENTS

| | | |
|---|---|---|
| JP | 4-73331 A | 3/1992 |
| JP | 4-143428 A | 5/1992 |
| JP | 2001-295681 A | 10/2001 |
| JP | 2001295681 A * | 10/2001 |
| JP | 2002-372148 A | 12/2002 |
| JP | 2005-280392 A | 10/2005 |

OTHER PUBLICATIONS

Supplemental European Search Report dated Oct. 8, 2012 (eight (8) pages).

* cited by examiner

PRIME MOVER ROTATION SPEED CONTROL SYSTEM FOR HYDRAULICALLY DRIVEN VEHICLE

TECHNICAL FIELD

The present invention relates to a prime mover rotation speed control system for hydraulically driven vehicle such as a wheeled hydraulic excavator.

BACKGROUND ART

Generally, a hydraulically driven vehicle such as a wheeled hydraulic excavator obtains a desired traveling speed by operating a travel pedal so as to increase or decrease the rotation speed of a prime mover for controlling a pump discharge amount. Among this type of hydraulically driven vehicles, there is a device known in the related art that increases the maximum rotation speed of a prime mover by a predetermined amount to increase the output horsepower when the traveling load is at a predetermined value or more and the travel pedal is operated (see Patent Literature 1).
Patent Literature 1: Japanese Patent Laid-open Publication No. 2001-295681.

DISCLOSURE OF THE INVENTION

Problem to be Solved by the Invention

With the system disclosed in Patent Literature 1, there is a possibility that a desired traveling speed cannot be obtained when the traveling load is below the predetermined value, since the maximum rotation speed of the prime mover does not increase, while the traveling pedal is fully operated.

Means for Solving the Problems

A prime mover rotation speed control system for hydraulically driven vehicle according to a first aspect of the present invention comprises: a hydraulic pump driven by a prime mover; a hydraulic motor for traveling driven with pressure oil supplied from the hydraulic pump; an operation member that outputs a travel command in accordance with an amount of operation by the operation member; a flow control device that controls one of a flow of the pressure oil from the hydraulic pump to the hydraulic motor and a flow rate of the pressure oil discharged from the hydraulic motor, based on the travel command that is output in accordance with the amount of operation by the operation member; a target rotation number outputting device that outputs a target rotation number of the prime mover based on a command; a rotation number control device that controls a rotation number of the prime mover to be the target rotation number; a vehicle speed detection device that detects a vehicle speed; and a vehicle speed calculation device that calculates a target vehicle speed in accordance with the amount of operation by the operation member, wherein the rotation number control device comprises a correction device that adjusts the target rotation number based on the vehicle speed detected by the vehicle speed detection device and the target vehicle speed calculated by the vehicle speed calculation device.

According to a second aspect of the present invention, in the prime mover rotation speed control system for hydraulically driven vehicle according to the first aspect, the target rotation number outputting device may output the target rotation number based on the travel command that is output in accordance with the amount of operation by the operation member.

According to a third aspect of the present invention, the prime mover rotation speed control system for hydraulically driven vehicle according to the first aspect may further comprises a rotation number setting device that indicates the target rotation number of the prime mover, and the target rotation number outputting device may output the target rotation number based on a command output from the rotation number setting device.

According to a fourth aspect of the present invention, in the prime mover rotation speed control system for hydraulically driven vehicle according to the second aspect, it is preferable that the correction device increases or decreases a target rotation number corresponding to a maximal operation of the operation member based on the detected vehicle speed and the target vehicle speed.

According to a fifth aspect of the present invention, in the prime mover rotation speed control system for hydraulically driven vehicle according to the third aspect, the correction device may increase or decrease a target rotation number corresponding to a maximal indication value of the rotation number setting device based on the detected vehicle speed and the target vehicle speed.

According to a sixth aspect of the present invention, in the prime mover rotation speed control system for hydraulically driven vehicle according to any of the first to fifth aspects, it is preferable that the correction device sets a larger correction amount of the target rotation number for a larger deviation between the detected vehicle speed and the target vehicle speed.

According to a seventh aspect of the present invention, in the prime mover rotation speed control system for hydraulically driven vehicle according to the sixth aspect, the correction device may limit the correction amount of the target rotation number to a predetermined correction amount when the deviation is a predetermined value or more.

According to a eighth aspect of the present invention, in the prime mover rotation speed control system for hydraulically driven vehicle according to any of the first to seventh aspects, it is preferable that a load detection device that detects a traveling load of the hydraulically driven vehicle is further provided, and that the correction device corrects the target rotation number to be a maximum rotation number regardless of the target vehicle speed calculated by the vehicle speed detection device when the traveling load detected by the load detection device is a predetermined value or more.

Advantageous Effect of the Invention

According to the present invention, the rotation speed of the prime mover is adjusted based on the target vehicle speed corresponding to the operation amount of the operation member and on the actual vehicle speed so that the vehicle can travel at the target speed, and therefore a desired traveling speed can be obtained.

BEST MODE FOR CARRYING OUT THE INVENTION

Hereinafter, explanation is made on an embodiment in which the present invention is applied to a wheeled hydraulic excavator referring to FIGS. 1 to 9.

The wheeled hydraulic excavator includes a traveling body and a swiveling body that is rotatably provided on the traveling body. A working attachment is attached to the swiveling body. The traveling body is provided with a variable displacement hydraulic motor 5 for traveling that is driven by a hydraulic circuit for traveling as shown in FIG. 1.

Figure 1:
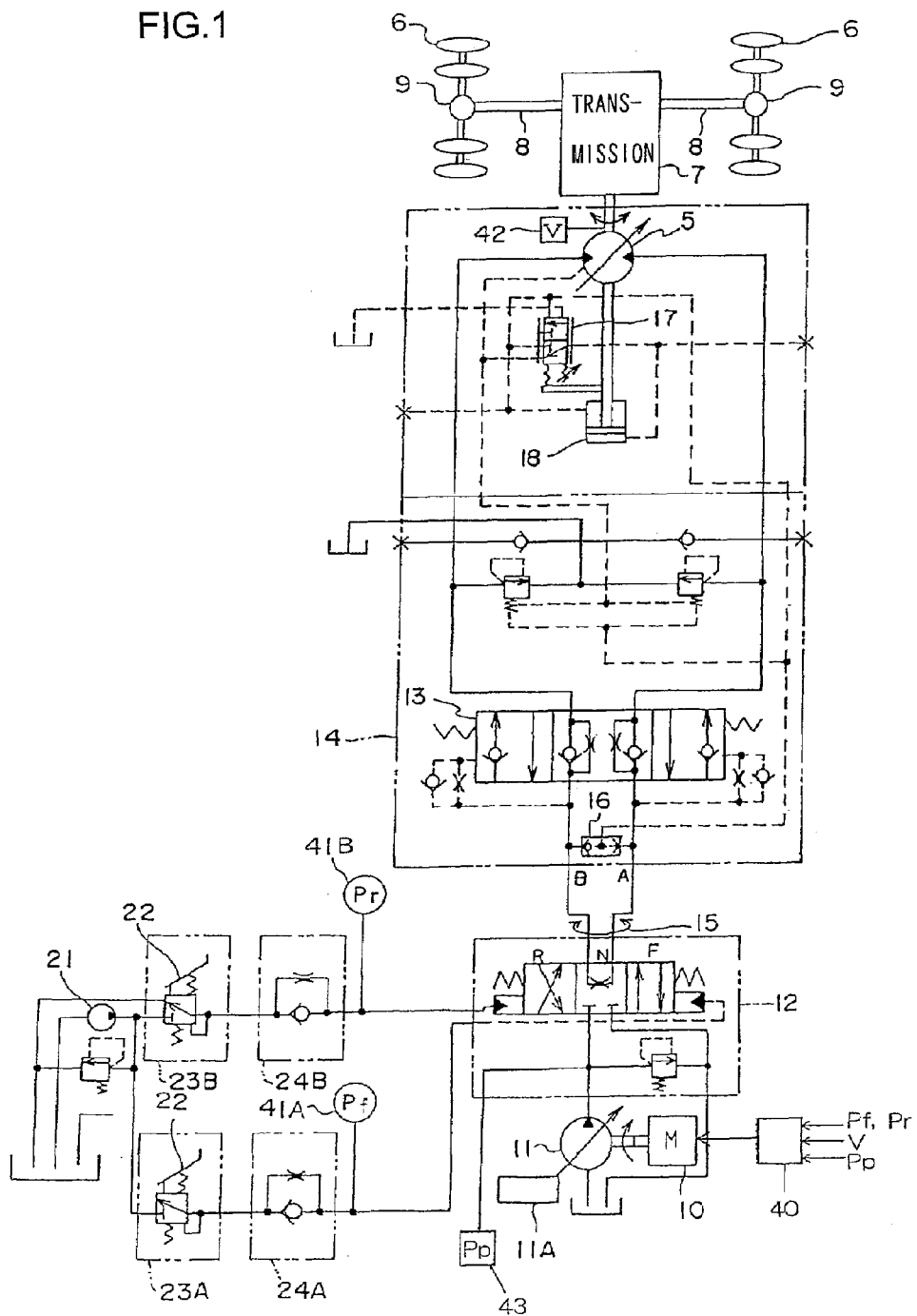
FIG. 1 is a hydraulic circuit diagram showing the configuration of the prime mover control system according to an embodiment of the present invention.

As shown in FIG. 1, the discharged oil from a variable displacement type main pump 11, which is driven by an engine 10, is controlled by a control valve 12 for its direction and flow rate and is supplied to a variable displacement traveling motor 5 through a brake valve 14 having incorporated therein a counter balance valve 13. The rotation speed of the traveling motor 5 is changed through a transmission 7. The rotation after the change is transmitted to tires 6 through propeller shafts 8 and axles 9, so that the wheeled hydraulic excavator travels.

The tilting amount of the main pump 11 is adjusted by a pump regulator 11A. The pump regulator is provided with a torque limiting unit, to which the pump discharge pressure is fed back to effect the control of horsepower. The horsepower control means a control of pump discharge pressure and displacement volume, so that the load that depends on both the pump discharge pressure and the pump displacement volume will not exceed the engine output. It should be noted that the regulator 11A is provided with a maximum tilting control unit, which determines the maximum flow rate of the main pump 11.

The control valve 12 controls its switching direction and stroke amount for a traveling pilot pressure from the pilot circuit. By adjusting the stroke amount of the control valve 12, the flow rate and the pressure of the pressure oil supplied to the traveling motor 5 are adjusted, so that the traveling speed of the vehicle can be controlled. The pilot circuit includes a pilot pump 21, a pair of traveling pilot valves 23A, 23B that generate a pilot secondary pressure in response to pressing down on the traveling pedal 22, and a pair of slow-return valves 24A, 24B that are connected subsequent to the pilot valves 23A, 23B, respectively, and delay the pressure oil that is returned to the pilot valves 23A, 23B, respectively.

The traveling pedal 22 can be rotated frontward and rearward by pressing down operation on the front side of the pedal (front pressing) and pressing down operation on the rear side of the pedal (rear pressing), respectively. The pilot valve 23A is actuated by the front pressing operation on the traveling pedal 22 and the pilot valve 23B is actuated by the rear pressing operation on the traveling pedal 22. By actuating the pilot valves 23A, 23b, pilot pressure depending on the operation amount of the traveling pedal 22 is generated.

The traveling motor 5 includes a self-pressure tilting control mechanism, with which the displacement is increased to perform driving at low speed/high torque as the drive pressure increases whereas the displacement is decreased to perform driving at high speed/low torque as the drive pressure is decreased. The drive pressure acts on a control piston 17 and a servo piston 18 of the traveling motor 5 through a shuttle valve 16 in the brake valve 14.

In FIG. 1, the pilot pressure from the main pump 21 acts on a corresponding pilot port of the control valve 12 when the traveling pedal 22 is pressed down on the front side or rear side of the traveling pedal 22, and the control valve 12 is switched to an F position or an R position depending on the pilot pressure. By this switching, the discharged oil from the main pump 11 is conducted to the traveling motor 5 through the control valve 12, a center joint 15, and the brake valve 14. At the same time, the delivered oil acts on the counter balance valve 13 as pilot pressure to switch the counter balance valve 13 from a neutral position. As a result, the traveling motor 5 is driven to allow the wheeled hydraulic excavator to travel.

The traveling pilot pressures Pf, Pr that correspond to operations of pressing down on the traveling pedal 22 on its front and rear sides, respectively, are detected by pressure sensors 41A, 41B. Amounts of operation of the pedal are detected based on detected values of the pressure sensors 41A, 41B. The discharge pressure (traveling drive pressure) of the hydraulic pump 11 is detected by a pressure sensor 43. The output speed of the traveling motor 5 is detected by a vehicle speed sensor 42. Vehicle speed v, which depends on the output speed of the motor 5 and a reduction gear ratio of the transmission, is detected based on a detected value of the vehicle speed sensor 42. Signals from the sensors 41A, 41B, 42 and 43 are input into a controller 40, in which the engine rotation speed is controlled as described below.

Figure 2:
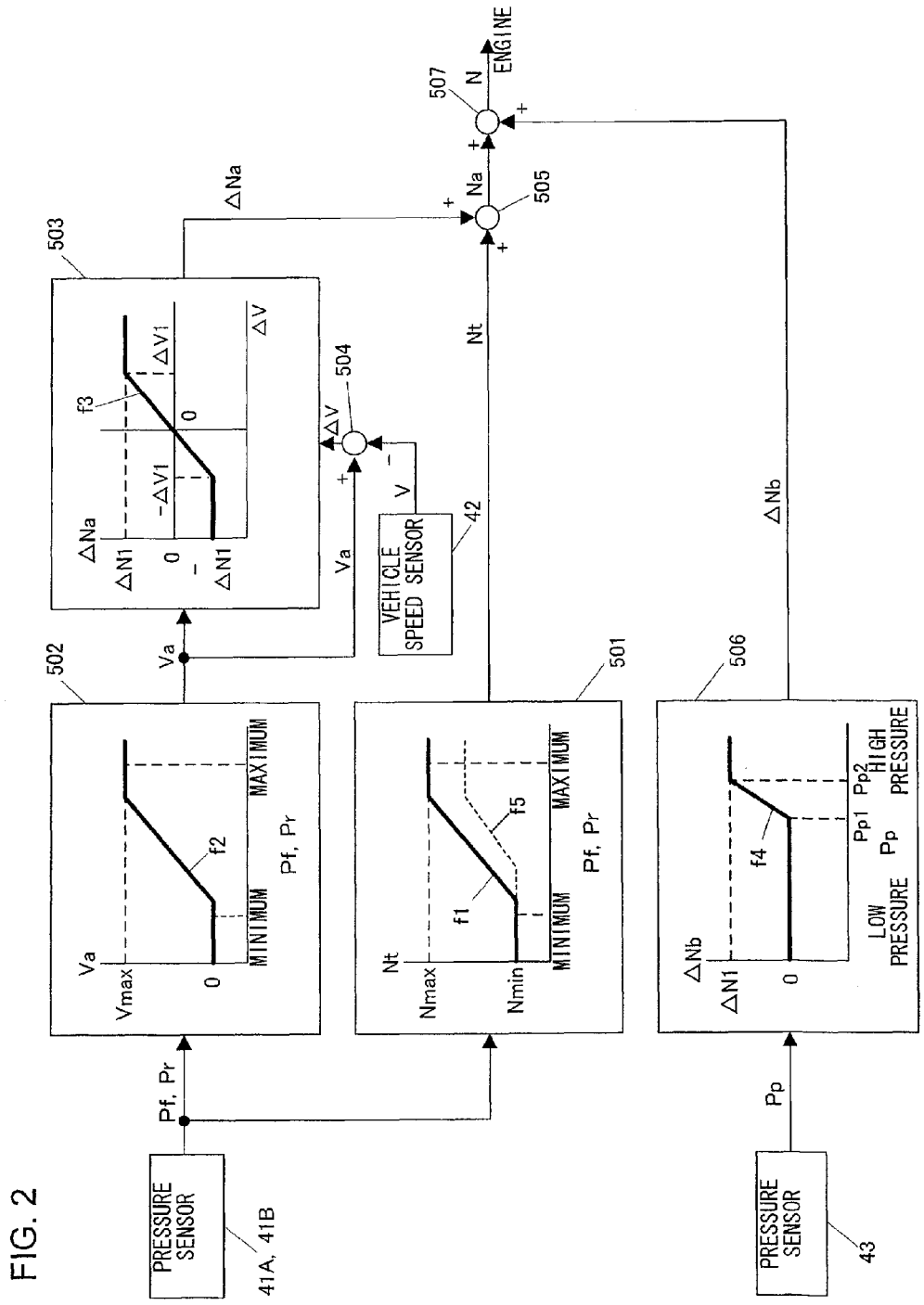
FIG. 2 is a block diagram illustrating an example of the processing performed in the controller shown in FIG. 1.

FIG. 2 is a block diagram illustrating the processing related to the control of the engine rotation speed in the controller 90. The controller 40 is configured as an arithmetic processing unit comprising a CPU, a ROM, a RAM, and other peripheral circuits. A function generator 501 stores characteristic f1 for a target rotation number Nt that corresponds to the traveling pilot pressures Pf, Pr (pedal operation amounts) as shown in FIG. 2, in advance. According to the characteristic f1, the target rotation number Nt proportionally increases from a minimum rotation number Nmin to a maximum rotation number Nmax as the traveling pilot pressures Pf, Pr increase. The target rotation number Nt corresponding to the traveling pilot pressures Pf, Pr based on the characteristic f1 is output from the function generator 501.

The function generator 502 stores a characteristic f2 for the target vehicle speed Va, which correspond to the traveling pilot pressures Pf, Pr, (pedal operation amounts) as shown in FIG. 2, in advance. According to the characteristic f2, the target vehicle speed va proportionally increases from 0 to a maximum vehicle speed vmax as the traveling pilot pressures Pf, Pr increase. The target vehicle speed va, which corresponds to the traveling pilot pressures Pf, Pr based on the characteristic f2, is output from the function generator 502. The maximum vehicle speed vmax in FIG. 2 corresponds to the maximum vehicle speed vmax in the traveling performance diagram (see FIG. 7) when the traveling pedal 22 is fully operated.

In a subtracter 504, an actual vehicle speed v is subtracted from the target vehicle speed va to calculate a speed deviation $\Delta v$ (=va−v).

A function generator 503 stores a characteristic f3 of a correction rotation number ΔNa, which depends on the speed deviation Δv as shown in FIG. 2, in advance. According to the characteristic f3, the correction rotation number ΔNa is 0, when the speed deviation Δv is 0, and the absolute value of the correction rotation number ΔNa increases as the absolute value of the speed deviation Δv increases. That is, in a range where the speed deviation Δv is equal to or greater than a predetermined value −Δv1 and less than a predetermined value Δv1 (−v1≦Δv≦Δv1), the correction rotation number ΔNa proportionally increases as the speed deviation Δv increases. On the other hand, in a range where the speed deviation Δv is less than the predetermined value −Δv1 (Δv<−Δv1) and in a range where the speed deviation Δv is equal to or more than the predetermined value Δv1 (Δv≧Δv1), the correction rotation numbers ΔNa are limited to predetermined values −ΔN1 and +ΔN1, respectively. The correction rotation number ΔNa corresponding to the speed deviation Δv is output based on the characteristic f3 from the function generator 503.

In an adder 505, the correction rotation number ΔNa is added to the target rotation number Nt to calculate a target rotation number Na after correction (=Nt+ΔNa).

A function generator 506 stores therein a characteristic f4 for a correction rotation number ΔNb, which corresponds to the pump discharge pressure Pp as shown in FIG. 2, in advance. According to the characteristic f4, a correction rotation number ΔNb is 0 when the pump discharge pressure Pp is less than a predetermined value Pp1 (Pp<Pp1). The correction rotation number ΔNb proportionally increases as the pump discharge pressure Pp increases in a range where the pump discharge pressure Pp is equal to or more than a predetermined value Pp1 and less than a predetermined value Pp2 (Pp1≦Pp<Pp2). The correction rotation number Nb is at maximum ΔN1 in a range where the pump discharge pressure Pp is equal to or more than a predetermined value Pp2 (Pp≧Pp2).

In an adder 507, the correction rotation number ΔNb is added to the target rotation number Na and the resultant is output as a final target rotation number N (=Na+ΔNb). The controller 40 controls the rotation number so that the engine speed becomes a target rotation number N. For example, a rotation number detector that detects an actual rotation number of the engine 10 is provided and a signal that depends on a deviation between the detected value and the target rotation number N is output to an engine rotation control unit such as an electronic governor to control the actual rotation number of the engine 10 to become the target rotation number N.

In the above-mentioned processing, a value obtained by adding a maximum value of the correction rotation number ΔN1 to the maximum rotation number Nmax is a largest value of the target rotation number N. This is called a largest target rotation number Nx (=Nmax+ΔN1). The largest target rotation number Nx corresponds to an upper limit of the engine speed at which the engine 10 can operate normally.

Figure 3:
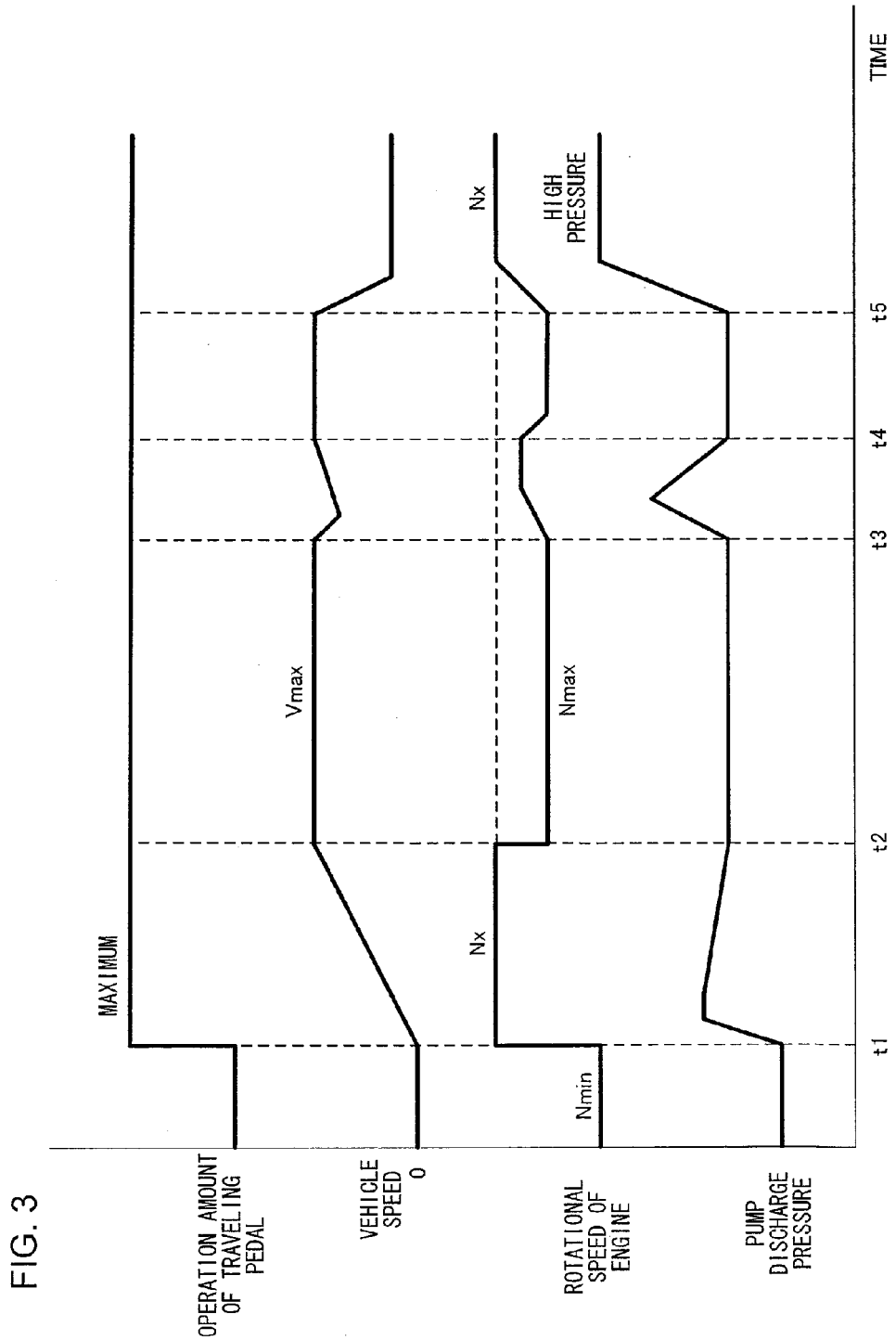
FIG. 3 is a timing chart illustrating the operation of the motor control system according to an embodiment of the present invention.

Principal operations of the prime mover control device according to the present embodiment are explained below. FIG. 3 is a timing chart illustrating the operations of the prime mover control device according to the present embodiment. It is assumed that in an initial state, the traveling pedal 22 is not operated, the vehicle speed v is 0, the engine rotation speed is a minimum rotation number Nmin, and the pump discharge pressure Pp is minimal. Starting from this state and when the traveling pedal 22 is maximally operated at a time point t1 in FIG. 3, the control valve 12 is opened to supply the pressure oil from the hydraulic pump 11 to the traveling motor 5. As a result, the vehicle travels.

At this time, the maximum vehicle speed vmax is output from the function generator 502 as the target vehicle speed va. If the speed deviation Δv is greater than the predetermined value Δv1, ΔN1 is output as the correction rotation number ΔN. Therefore, the target rotation number N is the largest target rotation number Nx (=Nmax+ΔN1), which means that the engine rotation speed is greater than the maximum rotation number Nmax by ΔN1. This increases the maximum horsepower that can be absorbed by the hydraulic pump 11 to improve the acceleration performance upon traveling so that the vehicle speed v can be rapidly increased to the target vehicle speed va (=vmax) in response to the pedal operation.

When the vehicle speed v reaches the maximum vehicle speed vmax at a time point t2, the speed deviation Δv is 0, through which the correction rotation number ΔN1 becomes 0, resulting in a decrease in the engine rotation speed to the maximum rotation number Nmax, while the maximum vehicle speed vmax is being maintained. Therefore, the vehicle speed v can be prevented from becoming higher than the maximum vehicle speed vmax. In addition, the vehicle can travel at the constant maximum vehicle speed vmax by compensating for the difference in performance by correcting the engine rotation speed in response to the vehicle speed, even if there are variations in the performances of devices such as the engine 10 and the hydraulic pump 11 due to the individual variability thereof. With this construction, the vehicle speed can be controlled to become the target vehicle speed va with high precision in response to the operation of the traveling pedal 22.

Figure 4:
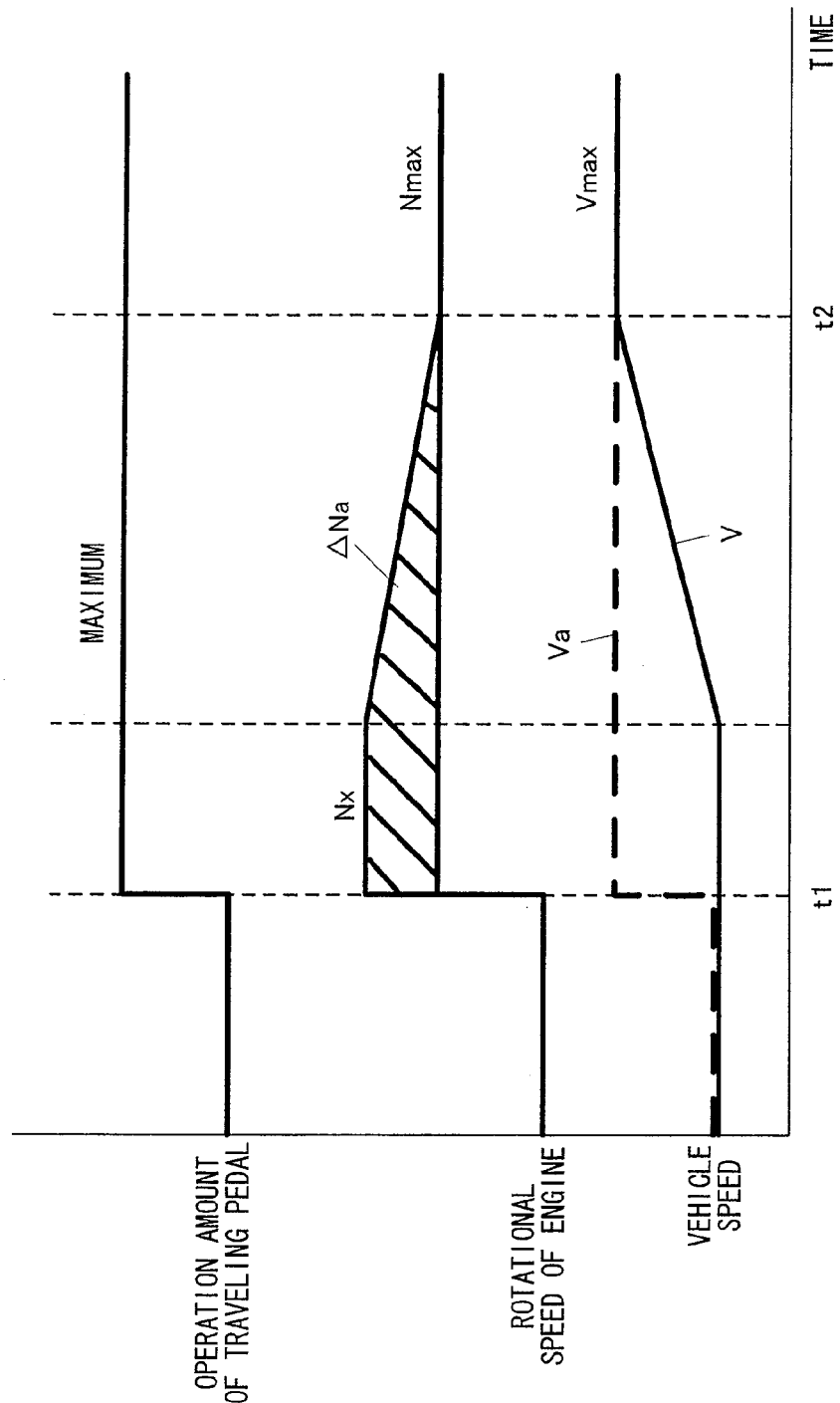
FIG. 4 is a timing chart illustrating a part of FIG. 3 in more detail.

FIG. 4 is a diagram illustrating changes of the engine rotation speed and vehicle speed v at time points t1 to t2 in greater detail. As shown in FIG. 4, the correction rotation number ΔNa (shaded area) is output in response to a difference between the target vehicle speed Va and the actual vehicle speed v (i.e., speed deviation Δv) corresponding to the operation amount of the traveling pedal 22. Over a range between time points t1 and t2, the correction rotation number ΔNa decreases gradually accompanying an increase in the vehicle speed v (i.e., a decrease in the speed deviation Δv) and the engine rotation speed is limited to the maximum rotation number Nmax subsequent to the time point t2.

In a range between the time points t3 to t4 in FIG. 3, if the traveling load (pump discharge pressure Pp) increases in a state in which the traveling pedal 22 is maximally operated to adjust the engine rotation speed to be the maximum rotation number Nmax, the vehicle speed v decreases. As a result, the correction rotation number ΔNa with a positive sign in response to the speed deviation Δv is output from the function generator 503 to increase the engine rotation speed. Thereafter, if the traveling load is decreased and the vehicle speed v is increased, the speed deviation Δv decreases, so that the correction rotation number ΔNa decreases and also the engine rotation speed decreases. In this manner, when the vehicle speed v varies due to the increase or decrease in the traveling load, the engine rotation speed increases or decreases accordingly, so that the vehicle speed v is maintained at the target vehicle speed va (=vmax).

For example, if hill-climb traveling is started at a time point t5 with keeping the traveling pedal 22 being maximally operated, and when the pump discharge pressure Pp reaches a value equal to or higher than a predetermined value Pp2, the correction rotation number Nb (=ΔN1) is output from the function generator 506. As a result, the correction rotation number ΔNb is added to the target rotation number Nt, so that the engine rotation speed is controlled to be at the maximum target rotation number Nx regardless of the vehicle speed v.

Therefore, when a high load is applied to the vehicle, the engine of the vehicle can output high horsepower in response thereto, so that high load traveling can be performed with ease.

Figure 5:
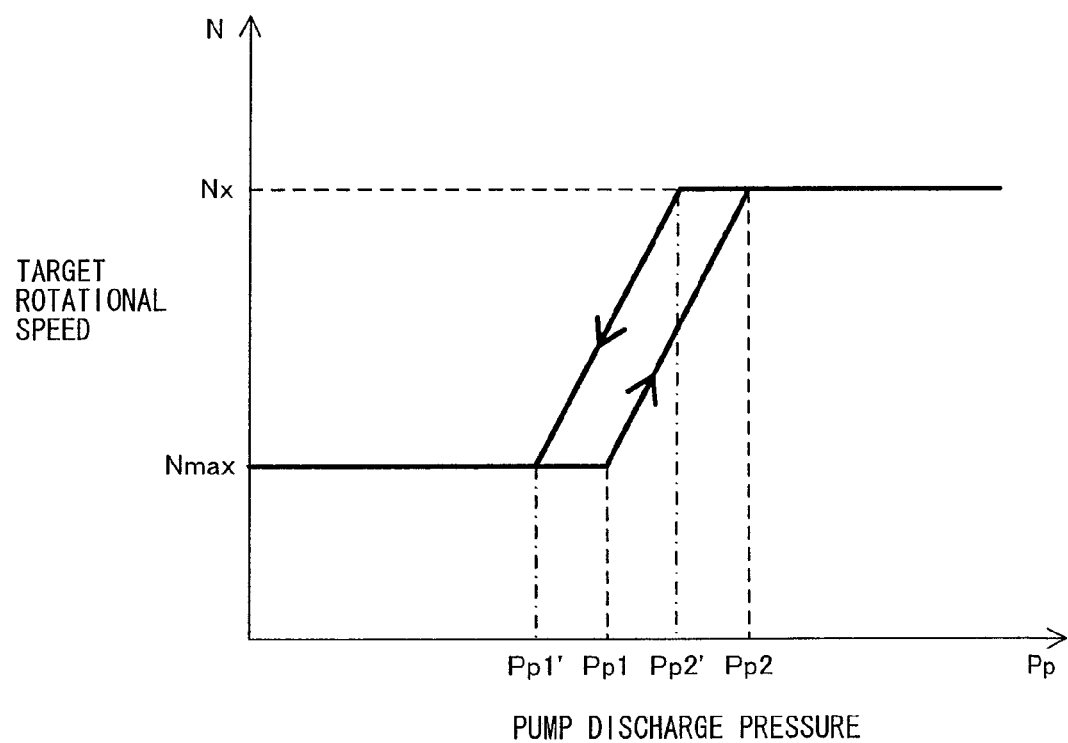
FIG. 5 is a characteristic curve illustrating an example of high horsepower operation.

The advantageous effects of the present embodiment are explained in comparison with high horsepower driving. High horsepower driving means the driving in which the maximum rotation speed of the engine 10 is increased if the traveling load increases to a predetermined value or higher in a state where the traveling pedal 22 is operated by a predetermined amount or more (for example, fully operated) and the maximum rotation number Nmax is output as the target rotation number Nt. In the high horsepower driving, the target rotation number N of the engine 1 upon full operation of the pedal is the maximum rotation number Nmax, for example, when the pump discharge pressure Pp is less than the predetermined value Pp1 as shown in FIG. 5. However, when the pump discharge pressure Pp is the predetermined value Pp1 or more due to an increase in the pump discharge pressure Pp, the target rotation number N increases proportionally accompanying the increase in the pump discharge pressure Pp. When the pump discharge pressure Pp increases to the predetermined value Pp2 or more, the target rotation number N assumes the largest target rotation number Nx (=Nmax+ $\Delta$N1). Thereafter, when the pump discharge pressure decreases to below a predetermined value Pp2' due to a decrease in the pump discharge pressure Pp, the target rotation number N decreases proportionally as the pump discharge pressure Pp decreases, and when the pump discharge pressure Pp is below a predetermined value Pp1', the target rotation number N becomes the maximum rotation number Nmax. Note that in FIG. 5, the characteristic of the target rotation number includes hysteresis, which is, however, not indispensable.

Figure 6:
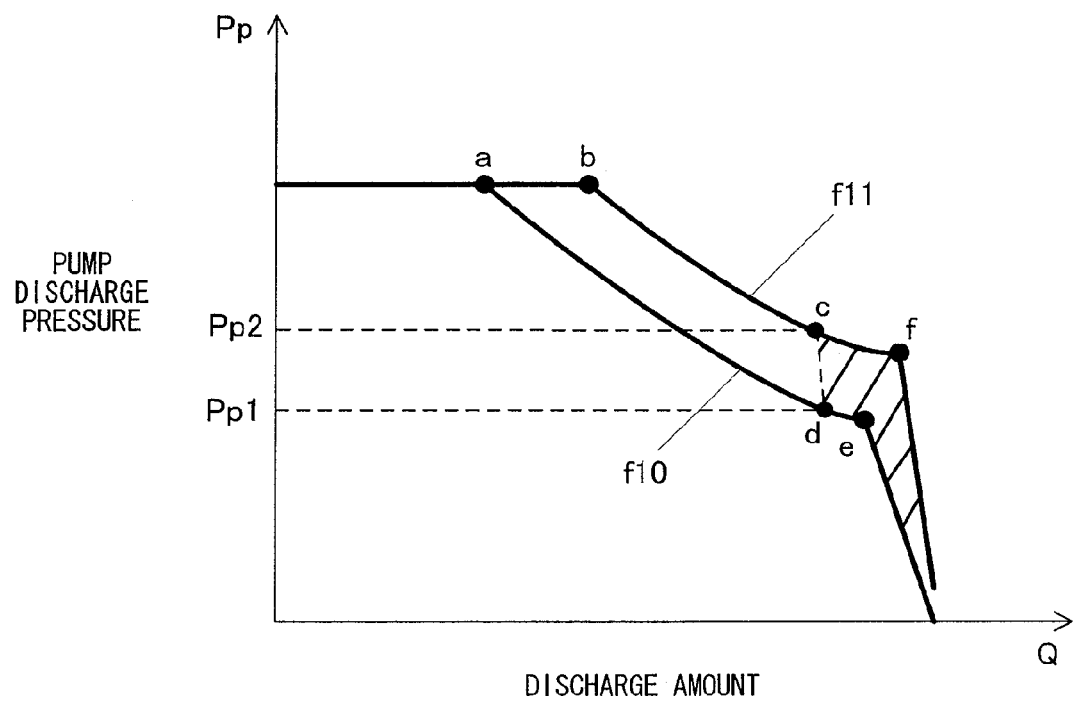
FIG. 6 is a PQ diagrammatic view explaining an advantageous effect of the embodiment of the present invention.

FIG. 6 is a diagram illustrating PQ characteristic of the hydraulic pump 11. In FIG. 6, the PQ characteristic when the engine rotation speed assumes the maximum rotation number Nmax is represented by f10 and the PQ characteristic when the engine rotation speed is the largest target rotation number Nx is represented by f11. In the high horsepower driving, the target rotation number increases from Nmax to Nx in a range of the pump discharge pressure Pp between the predetermined values Pp1 and Pp2. Thereafter, the PQ characteristic is expressed by a curve connecting points a, b, c, d, and e in FIG. 6. That is, the PQ characteristic is expressed by the characteristic f11 at high loads and by the characteristic f10 at low loads. The high horsepower driving can increase the pump discharge flow rate Q especially at high loads.

Whereas, in the present embodiment, the engine rotation speed is controlled to largest maximum target rotation number Nx regardless of traveling loads, if the actual vehicle speed v is lower than the target vehicle speed va by the predetermined value $\Delta$v1 or more when the pedal has been maximally pressed down. Therefore, the PQ characteristic on this condition is expressed by a curve connecting the points a, b, c, and f in FIG. 6, that is the characteristic f11, so that the pump flow rate Q can be increased not only at high loads but also at low loads. In particular, as compared with the high horsepower driving, the pump flow rate Q can be increased in the shaded area in FIG. 6.

Figure 7:
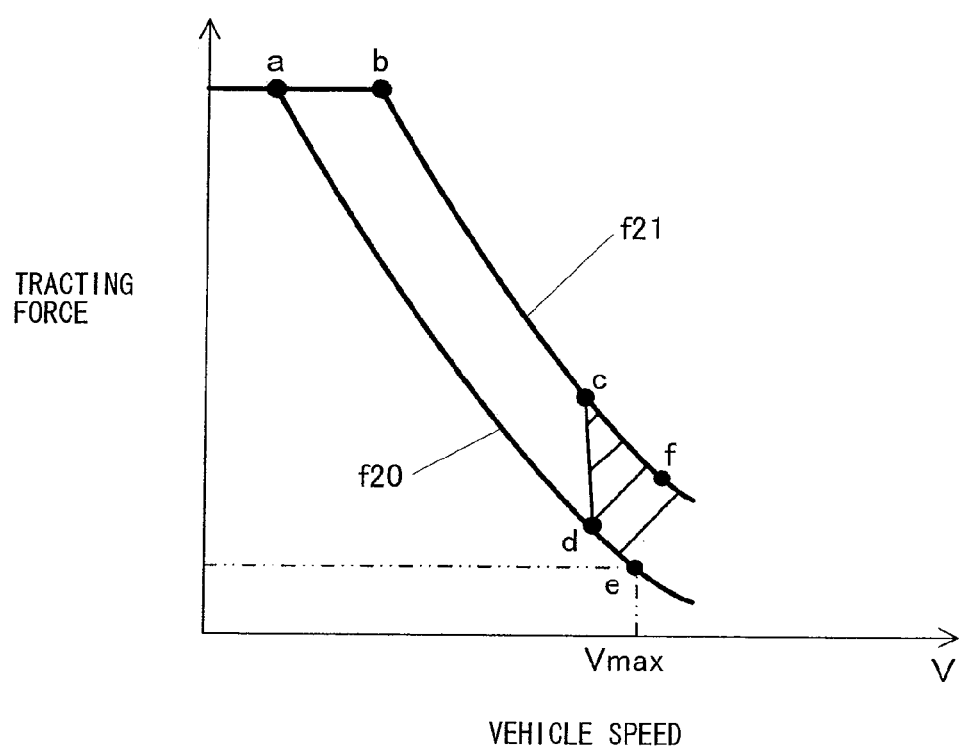
FIG. 7 is a diagrammatic view explaining traveling performance of the embodiment of the present invention.

FIG. 7 is a traveling performance diagram illustrating the relationship between the vehicle speed v and traction force. In FIG. 7, the characteristic f20 is the one when the engine rotation speed is at the maximum rotation number Nmax whereas a characteristic f21 is the one when the engine rotation speed is at the largest target rotation number Nx. As mentioned above, the pump flow rate Q increases upon high load traveling in the high horsepower driving (see FIG. 6), the traveling performance diagram in the high horsepower driving is expressed by the curve connecting the points a, b, c, d, and e in FIG. 7. In contrast, in the present embodiment, the engine rotation speed can be increased to the maximum target rotation number Nx in response to the speed deviation $\Delta$v, so that the traveling performance diagram is expressed by the characteristic f21, that is, by the curve connecting the points a, b, c, and f in FIG. 7. Therefore, in the present embodiment, the vehicle speed v can be increased even in the low load area where the vehicle speed cannot be increased by the high horsepower driving (see the shaded area in FIG. 7), so that the vehicle speed v can be controlled to the maximum vehicle speed vmax regardless of the traveling loads.

According to the present embodiment, the following advantageous effects can be obtained.

(1) The target vehicle speed va is calculated depending on the operation amount of the traveling pedal 22, and the engine rotation number is corrected in response to the deviation $\Delta$v between the target vehicle speed va and the actual vehicle speed v. This allows the vehicle speed v to be increased by increasing the engine rotation speed to a level higher than the maximum rotation number Nmax, when the vehicle speed v does not reach the maximum vehicle speed vmax upon fully operating the traveling pedal 22, so that a desired traveling speed in response to the operation amount of the pedal can be obtained with ease.

(2) Generally, since there is individual variability in the maximum rotation speed of the engine and the displacement of the hydraulic pump, there is the possibility that the traveling speeds of hydraulically driven vehicles differ due to variations of their performances. In the present embodiment, the engine rotation speed is increased or decreased in response to the deviation $\Delta$v between the target vehicle speed va and the actual vehicle speed v, the vehicle speed can be easily controlled to become the maximum vehicle speed vmax with precision upon the maximum pressing down on the traveling pedal 22 in spite of variations in individual engine performances, if any. In addition, an excellent acceleration performance can be obtained by correcting the target rotation number N based on the deviation $\Delta$v between the target vehicle speed va and the actual vehicle speed v.

(3) Since it is so arranged that the larger the absolute value of the speed deviation $\Delta$v is, the larger is set the absolute value of the correction amount $\Delta$Na, the vehicle speed v can be easily controlled to the target vehicle speed va in response to the pedal operation amount, so that the control of the vehicle speed of hydraulic drive vehicle can be optimally achieved.

(4) The correction amount $\Delta$Na of the engine rotation speed is limited to the predetermined value $\Delta$N1 when the speed deviation $\Delta$v is the predetermined value $\Delta$v1 or more. As a result, the upper limit of the engine rotation number can be held to the maximum target rotation number Nx or less and damages of the engine 1 due to its over speed can be prevented.

(5) When the pump discharge pressure Pp (traveling load) reaches the predetermined value Pp2 or higher, the engine rotation speed is made larger than ever by the predetermined value $\Delta$N1 regardless of the height of the target vehicle speed va. This facilitates hill-climb traveling and the like.

Note that in the above-mentioned embodiment, the correction rotation number $\Delta$Nb in response to the traveling load is calculated based on the characteristic f4 of the function generator 506 and the calculated correction rotation number $\Delta$Nb is added to the target rotation number Na in the adder 507. However, the characteristic f4 of the function generator 506 is not limited to this. For example, a characteristic, in which the target rotation number is set to the maximum target rotation number Nx when the pump discharge pressure Pp assumes the predetermined value Pp2 or higher, may be set to the function generator 506. In such a case, a maximum value selection circuit may be provided instead of the adder 507 in order to control the engine rotation number to become the maximum target rotation number Nx regardless of the operation amount of the traveling pedal 22. This enables traveling suitable for high loads to be performed without maximally pressing down on the traveling pedal 22.

In the above-mentioned embodiment, the control of the engine rotation speed during traveling has been explained. However, when the engine rotation speed is to be controlled upon working, it may be constructed such that a characteristic f5 (broken line) of work engine rotation speed depending on the operation amount of the traveling pedal 22 is set in advance, for example, in the function generator 501 shown in FIG. 2 and the engine rotation speed is controlled based on the characteristic f5. In such a case, first the actuation/non-actuation state of a working brake is detected. Then, when the working brake is actuated, that is when the vehicle is in working operation, the characteristic f5 can be selected, whereas the characteristic f1 can be selected when the working brake is non-actuated, that is when the vehicle is not in working operation. When the characteristic f5 is selected, the processing in the adder 505 is passed on and the engine rotation number can be increased in the adder 507 upon high load working. In FIG. 2, the slope of the characteristic f5 upon working is made gentle and small in the maximum rotation number as compared with the characteristic f1 upon traveling. However, the shape of the characteristic f5 is not limited to this.

In the above-mentioned embodiment, the deviation Δv between the target vehicle va, which depends on the operation amount of the pedal, and the actual vehicle speed v, is calculated, and the correction amount Δa of the engine rotation speed is made larger for the larger deviation Δv. However, when the target rotation number is to be corrected based at least on the vehicle speed v and the target vehicle speed va, the configuration of the correction means is not limited to the above-mentioned ones. In the function generator 501, the target vehicle speed va corresponding to the operation amount of the pedal is calculated on the characteristic f1. However, the configuration of the vehicle speed calculation means is not limited thereto.

Figure 8:
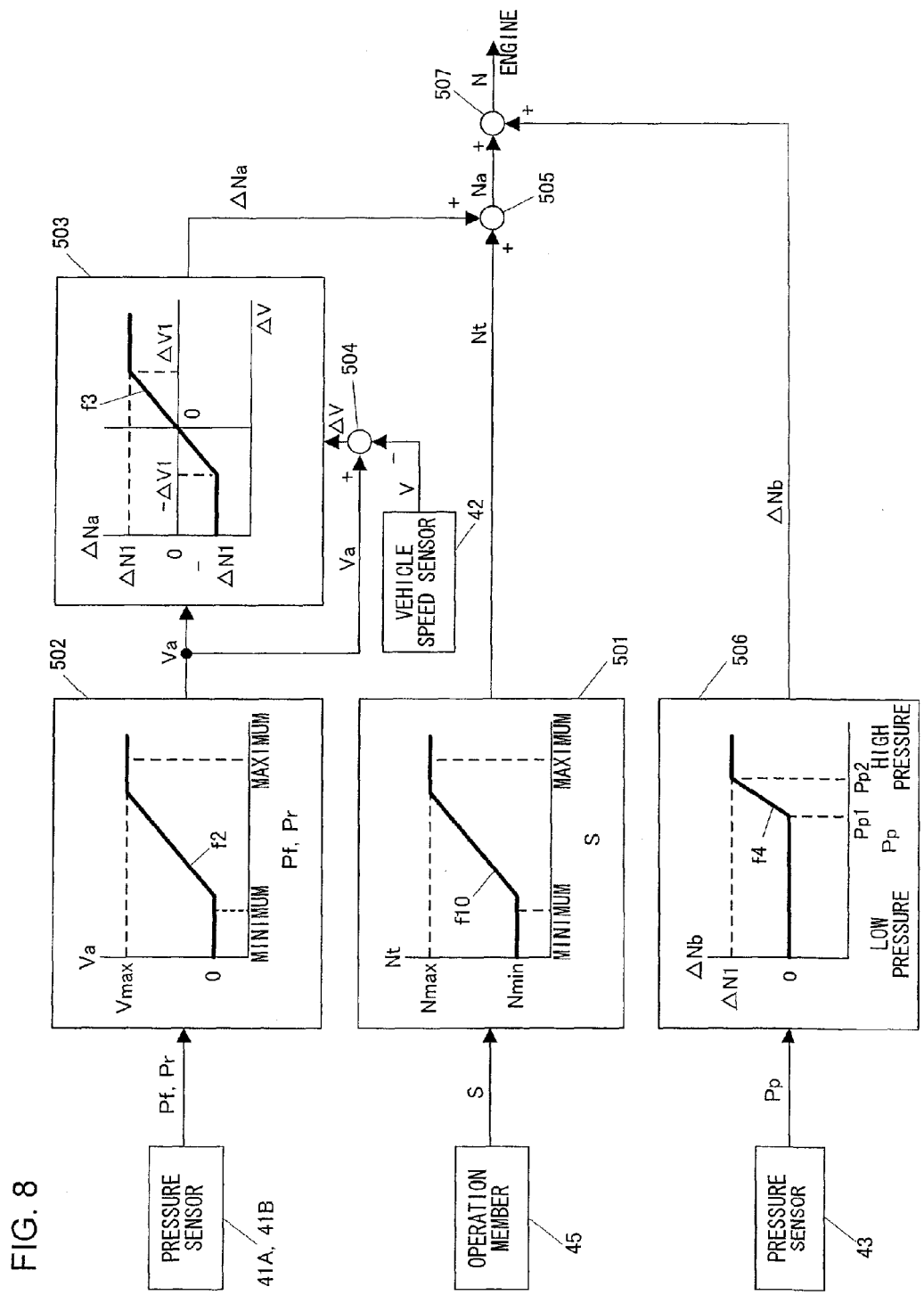
FIG. 8 is a diagram showing a variation of FIG. 2.
Figure 9:
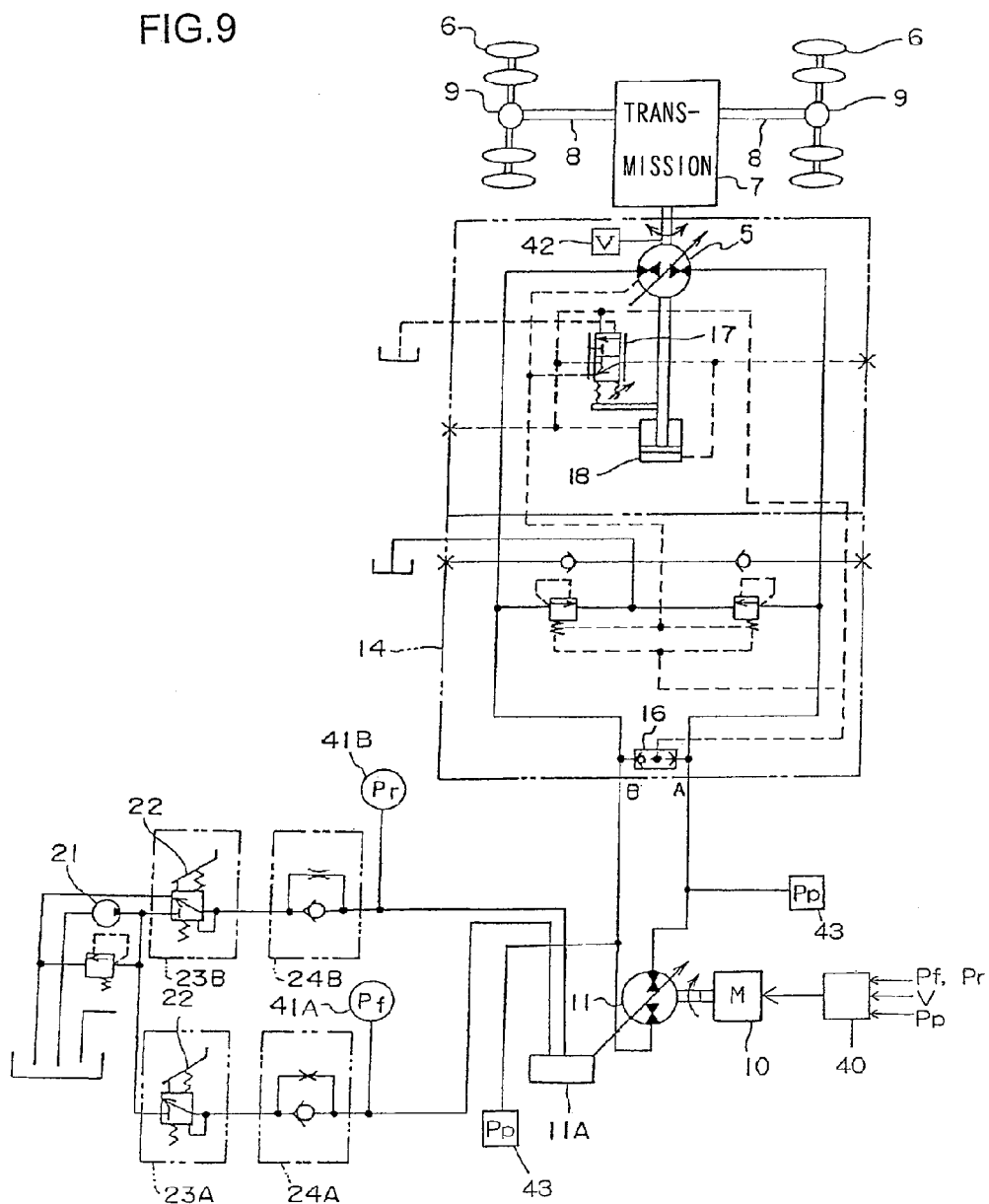
FIG. 9 is a diagram showing a variation of FIG. 1.

In the above-mentioned embodiment, the target rotation number Nt corresponding to the operation amount of the traveling pedal 22 is set in the function generator 501, and a signal depending on the deviation Δv between the actual rotation speed and the target rotation number N of the engine 1 is output to an engine rotation speed control unit, thereby controlling the engine rotation speed to become the target rotation number N depending on the operation amount of the pedal. However, the configuration of the rotation number control means is not limited thereto. For example, an operation member 45 for setting a target rotation number may be separately provided as shown in FIG. 8 in order to set the target rotation number Nt depending on the operation amount of the operation member 45. The operation member 45 as the rotation number setting means may be constituted by a dial or the like. As shown in FIG. 8, based on the characteristic f10 of a command value s which is set in advance depending on the operation amount of the dial and of the target rotation number Nt, the target rotation number Nt may be output from the function generator 501 and the engine rotation speed can be controlled based on the correction rotation number ΔNa that depends on the target rotation number Nt and the speed deviation Δv. That is, it may be configured that the flow rate supplied to the motor 5 can be controlled by switching the control valve 12 by the operation of the traveling pedal 22 while the target rotation number Nt is being kept constant, thus controlling the vehicle speed. Note that in the characteristic f10, the target rotation number that corresponds to the largest command value from the operation of the operation member 45 may be set to Nmax.

A traveling command may be output by an operation member other than the traveling pedal 22. The flow of pressure oil from the hydraulic pump 11 to the hydraulic motor 5 is controlled by the control valve 12. However, the flow control means is not limited thereto. For example, the flow control means may be configured as an HST circuit that includes the hydraulic pump 11 and the hydraulic motor 5 connected to each other so as to form a closed circuit in order to control the flow rate of the pressure oil discharged by the hydraulic pump 11 in response to the operation amount of the traveling pedal 22. The vehicle speed is detected by the vehicle sensor 42. However, the vehicle speed detection means may be of any type. The traveling load is detected by the pressure sensor 43. However, the load detection means may be of any type.

Although explanation has been made on the case where the prime mover speed control device of the present invention is applied to a wheeled hydraulic excavator, the present invention can also be applied to other hydraulically driven vehicles including a wheel loader and so on. That is, the present invention is not limited to the prime mover speed control device according to the embodiment of the present invention so far as the features and functions of the present invention can be realized therewith.

This application is based on Japanese Patent Application No. 2007-049723 (filed Feb. 28, 2007), the disclosure of which application is herein incorporated by reference.

The invention claimed is:

1. A prime mover rotation speed control system for hydraulically driven vehicle, comprising:

a hydraulic pump driven by a prime mover;

a hydraulic motor for traveling driven with pressure oil supplied from the hydraulic pump;

an operation member that outputs a travel command in accordance with an amount of operation by the operation member;

a flow control device that controls a traveling speed of the hydraulically driven vehicle by controlling one of a flow of the pressure oil from the hydraulic pump to the hydraulic motor and a flow rate of the pressure oil discharged from the hydraulic pump and supplied to the hydraulic motor for traveling, based on the travel command that is output in accordance with the amount of operation by the operation member;

a target rotation number outputting device that outputs a target rotation number of the prime mover in a range between a minimum rotation number and a maximum rotation number corresponding to the amount of operation of the operation member or an operation amount of a rotation number setting device, that indicates a target rotation number of the prime mover, based on a characteristic of a target rotation number corresponding to the amount of operation of the operation member or the operation amount of the rotation number setting device, the maximum rotation number being less than a largest target rotation number corresponding to an upper speed limit for normal operation of the prime mover;

a rotation number control device that controls a rotation number of the prime mover to be the target rotation number;

a vehicle speed detection device that detects a vehicle speed; and a vehicle speed calculation device that calculates a target vehicle speed in a range between 0 and a maximum vehicle speed determined in accordance with the amount of operation by the operation member based on a characteristic of the target vehicle speed corresponding to the amount of operation by the operation member, wherein:

the rotation number control device comprises a correction device that adjusts the target rotation number based on the vehicle speed detected by the vehicle speed detection device and the target vehicle speed calculated by the vehicle speed calculation device to a corrected target rotation number which is larger than the target rotation number determined by the target rotation number outputting device when the detected vehicle speed is smaller than the target vehicle speed, and to a corrected target rotation number which is smaller than the target rotation number determined by the target rotation number outputting device when the detected vehicle speed is greater than the target vehicle speed; and in a case where the maximum rotation number is output by the target rotation number outputting device as the target rotation number, the correction device adjusts the target rotation number to a corrected target rotation number which is larger than the maximum rotation number when the detected vehicle speed is smaller than the target vehicle speed.

2. A prime mover rotation speed control system for hydraulically driven vehicle, according to claim 1, wherein
the correction device sets a larger correction amount of the target rotation number for a larger deviation between the detected vehicle speed and the target vehicle speed.

3. A prime mover rotation speed control system for hydraulically driven vehicle, according to claim 2, wherein
the correction device limits the correction amount of the target rotation number to a predetermined correction amount when the deviation is a predetermined value or more.

4. A prime mover rotation speed control system for hydraulically driven vehicle, according to claim 1, further comprising:
a load detection device that detects a traveling load of the hydraulically driven vehicle, wherein
the correction device corrects the target rotation number to be the corrected target rotation number which is larger than the maximum rotation number regardless of the target vehicle speed calculated by the vehicle speed detection calculation device when the traveling load detected by the load detection device is equal to or greater than a predetermined value or more.

5. A prime mover rotation speed control system for hydraulically driven vehicle, according to claim 1, further comprising:
a load detection device that detects a traveling load of the hydraulically driven vehicle, wherein
in the case where the maximum rotation number is output as the target rotation number, the correction device corrects the target rotation number to be the corrected target rotation number which is larger than the maximum rotation number regardless of the vehicle speed detected by the vehicle speed detection device when the traveling load detected by the load detection device is equal to or greater than a predetermined value.

* * * * *